US012374471B2

(12) United States Patent
Valachovic et al.

(10) Patent No.: US 12,374,471 B2
(45) Date of Patent: Jul. 29, 2025

(54) CABLE HEATER ASSEMBLY WITH CABLE END ADAPTER SYSTEM

(71) Applicant: WATLOW ELECTRIC MANUFACTURING COMPANY, St. Louis, MO (US)

(72) Inventors: Paul M. Valachovic, St. Louis, MO (US); Bridget Eshelman, St. Louis, MO (US); Brett Bradshaw, St. Louis, MO (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 239 days.

(21) Appl. No.: 17/680,862

(22) Filed: Feb. 25, 2022

(65) Prior Publication Data

US 2022/0277872 A1 Sep. 1, 2022

Related U.S. Application Data

(60) Provisional application No. 63/153,768, filed on Feb. 25, 2021.

(51) Int. Cl.
*H01R 4/22* (2006.01)
*H01B 7/42* (2006.01)
(Continued)

(52) U.S. Cl.
CPC ............... *H01B 7/428* (2013.01); *H05B 3/56* (2013.01); *H01B 9/00* (2013.01); *H01R 4/22* (2013.01); *H05B 2203/016* (2013.01)

(58) Field of Classification Search
CPC . H01B 3/56; H01B 7/428; H01B 9/00; H02G 15/02; H02G 15/06; H02G 15/064;
(Continued)

(56) References Cited

U.S. PATENT DOCUMENTS 3,852,512 A * 12/1974 Herrmann, Jr. ...... H02G 15/064
174/74 A
4,877,943 A * 10/1989 Oiwa .................. H02G 15/043
174/74 A
(Continued)

FOREIGN PATENT DOCUMENTS

CA 2 512 687 A * 1/2007 ............ H01R 4/183
CN 106409449 A 2/2017
(Continued)

OTHER PUBLICATIONS

International Search Report and Written Opinion issued in corresponding International Application PCT/US2022/017876, mailed Jul. 25, 2022, 19 pages.
(Continued)

*Primary Examiner* — William H. Mayo, III
(74) *Attorney, Agent, or Firm* — Burris Law, PLLC

(57) ABSTRACT

A cable heater assembly includes a cable heater and an adapter system. The cable heater includes an outer sheath and a conductor. A portion of the conductor is exposed from the outer sheath. The adapter system includes an adapter body mounted to an end of the cable heater and a cap joined to the adapter body to enclose the portion of the conductor inside the cap.

20 Claims, 12 Drawing Sheets

(51) Int. Cl.
*H05B 3/56* (2006.01)
*H01B 9/00* (2006.01)

(58) Field of Classification Search
CPC ... H01R 4/02; H01R 4/10; H01R 4/18; H01R 4/22; H05B 3/02; H05B 3/06; H05B 2203/016
USPC ...... 174/19, 74 R, 74 A, 76, 77 R, 82, 84 R, 174/84 C, 88 S; 219/538, 553, 544, 546; 439/449, 430, 521–522, 877–878
See application file for complete search history.

(56) References Cited

U.S. PATENT DOCUMENTS

| | | | | |
|---|---|---|---|---|
| 5,622,642 | A * | 4/1997 | Edwards | H02G 15/043 24/114.5 |
| 5,767,448 | A * | 6/1998 | Dong | H05B 3/56 174/74 A |
| 5,792,987 | A * | 8/1998 | Dong | H02G 15/043 174/74 A |
| 2011/0017510 | A1* | 1/2011 | Emerson | E21B 17/0285 29/857 |
| 2014/0008350 | A1* | 1/2014 | Becker | H05B 3/50 219/553 |
| 2016/0064914 | A1* | 3/2016 | Janvrin | H02G 1/14 228/101 |
| 2017/0016565 | A1 | 1/2017 | Tkaczyk et al. | |

FOREIGN PATENT DOCUMENTS

| | | | |
|---|---|---|---|
| CN | 206136349 | U | 4/2017 |
| CN | 208623021 | U | 3/2019 |
| EP | 0847609 | | 6/1998 |
| TW | 201423776 | A | 6/2014 |

OTHER PUBLICATIONS

Search Report appended to an Office Action, which was issued to Taiwanese counterpart Application No. 111107096 by the TIPO on Aug. 18, 2022, 1 page.

Partial International Search Report issued in corresponding International Application PCT/US2022/017876, mailed Jun. 2, 2022.

Search Report issued to Taiwanese counterpart Application No. 111107096, dated Nov. 30, 2023, 1 page.

* cited by examiner

CABLE HEATER ASSEMBLY WITH CABLE END ADAPTER SYSTEM

CROSS-REFERENCE TO RELATED APPLICATION

This application claims priority to and the benefit of U.S. Provisional Patent Application No. 63/153,768, filed Feb. 25, 2021. The disclosure of the above application is incorporated herein by reference in its entirety.

FIELD

The present disclosure relates to cable heaters, and more particularly to connections of cable heaters to power cables.

BACKGROUND

The statements in this section merely provide background information related to the present disclosure and may not constitute prior art.

A cable heater is a small-diameter heating unit that can be bent to form a plurality of configurations depending on application needs. The heating cable includes an electrically conductive resistive heating element, an insulation layer surrounding the resistive heating element, and an outer sheath surrounding the insulation layer. Typically, the outer sheath of the cable heater needs to be stripped off to expose the conductor. This requires cutting and removing a short length of the outer sheath, removing the insulation layer around the conductor, and cleaning the conductor before the exposed conductor can be spliced to the conducting wires of a power cable. Similar preparation is required in connection of signal wires and in splicing of conduits.

This assembly process is generally difficult and time consuming. Moreover, after splicing, the spliced end needs to be electrically insulated and protected, making the assembling process even more difficult. The cable heater is prone to oxidation or moisture damage during splicing if the conductor is exposed to the outside environment for too long during splicing and/or if the spliced end is not properly insulated and sealed after splicing.

The present disclosure addresses these and other issues associated with assembling a cable heater, or other types of sheathed conductors, to a power or extension cable or conduit.

SUMMARY

This section provides a general summary of the disclosure and is not a comprehensive disclosure of its full scope or all of its features.

In one form, a cable heater assembly is provided, which includes a cable heater and an adapter system. The cable heater includes an outer sheath and an inner conductor. A portion of the conductor is exposed from the outer sheath. The adapter system includes an adapter body mounted to an end of the cable heater and a cap joined to the adapter body to enclose the exposed portion of the conductor inside the cap.

In another form, a cable heater and power cable assembly is provided, which includes a cable heater, a power cable and an adapter system. The cable heater includes an outer sheath and an inner conductor. A portion of the conductor is exposed from the outer sheath. The power cable includes an outer sheath and conducting wires exposed from the outer sheath of the power cable. The adapter system includes an adapter body secured around an outer sheath of the cable heater, an adapter sleeve, and a spacer bushing. The conductor of the cable heater is spliced to the conducting wires of the power cable to form a spliced end. The spliced end is disposed inside the adapter sleeve. The adapter body and the power cable sheath spacer bushing are inserted into opposing ends of the adapter sleeve, respectively.

In yet another form, a thermal and power cable assembly is provided, which includes a thermal element assembly, a power cable and an adapter system. The thermal element assembly includes an outer sheath and an inner conductor. A portion of the conductor is exposed from the outer sheath. The power cable includes an outer sheath and conducting wires exposed from the outer sheath of the power cable. The adapter system includes an adapter body secured around an outer sheath of the thermal element assembly, an adapter sleeve, and a spacer bushing. The conductor of the thermal element assembly is spliced to the conducting wires of the power cable to form a spliced end. The spliced end is disposed inside the adapter sleeve. The adapter body and the power cable sheath spacer bushing are inserted into opposing ends of the adapter sleeve, respectively.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2:
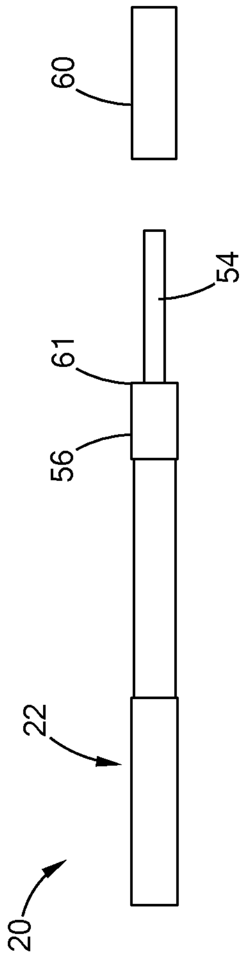
Figure 3:
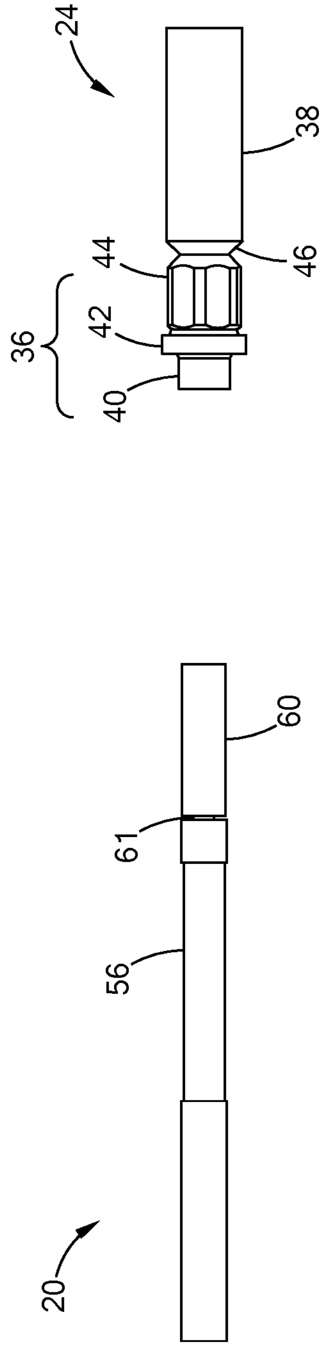
Figure 4:
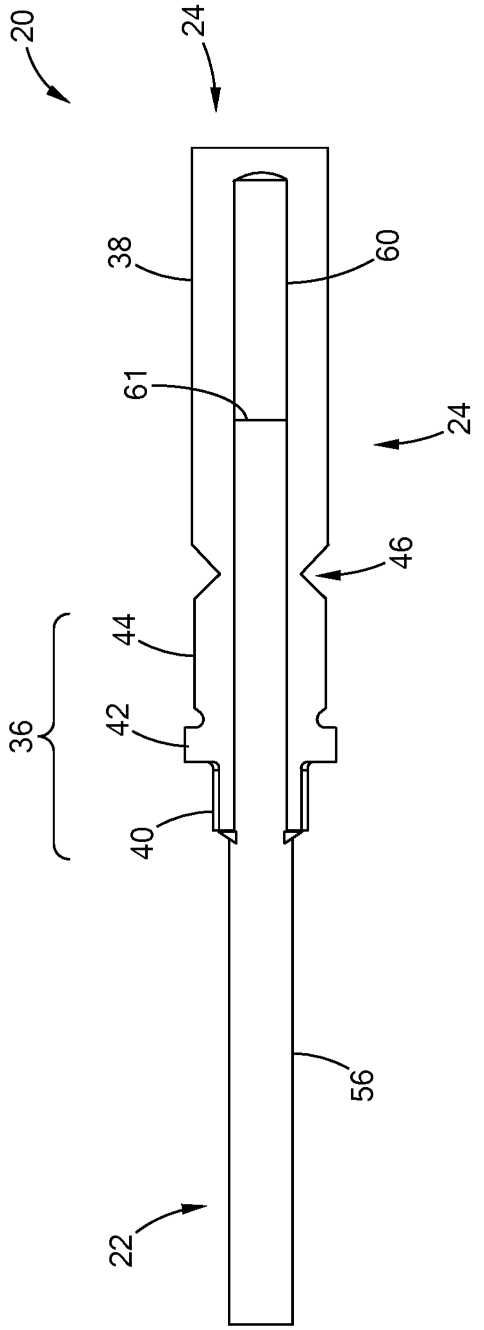
Figures 5A, 5B, 5C:
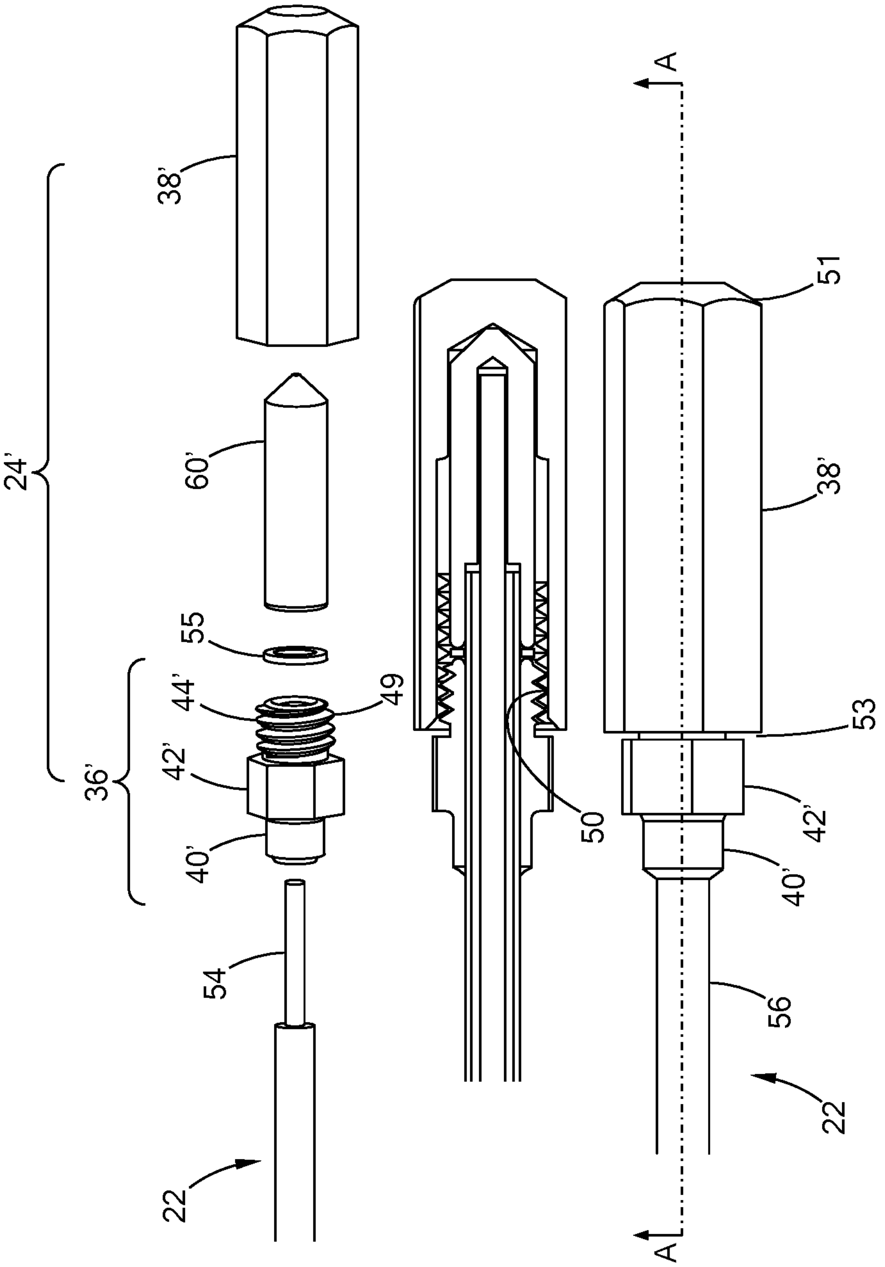
Figure 6:
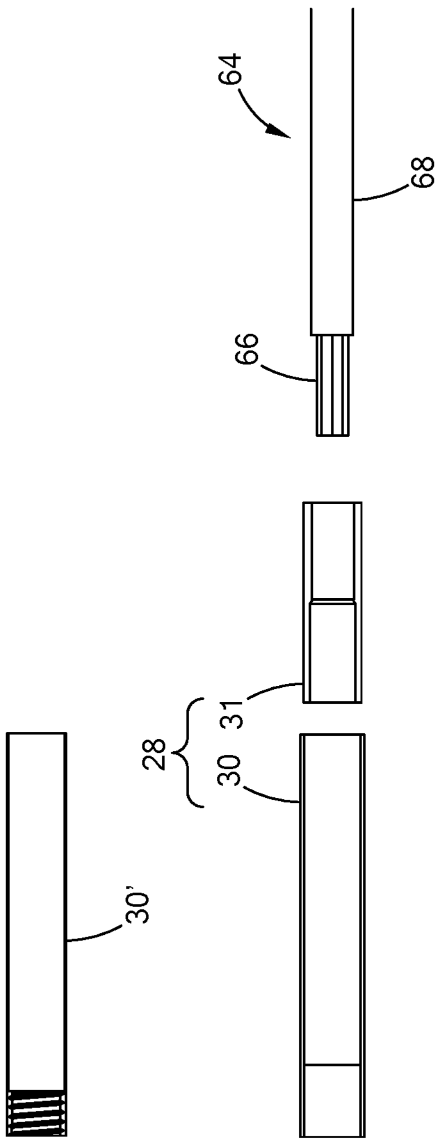
Figure 7:
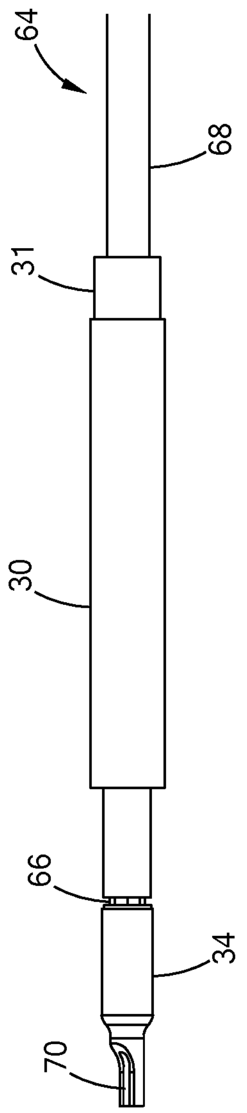
Figure 8:
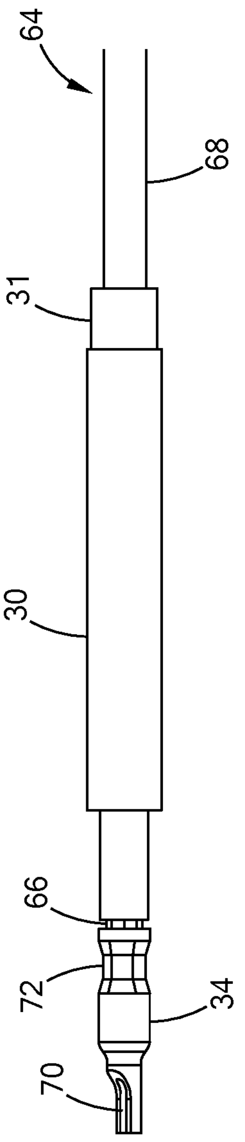
Figure 9:
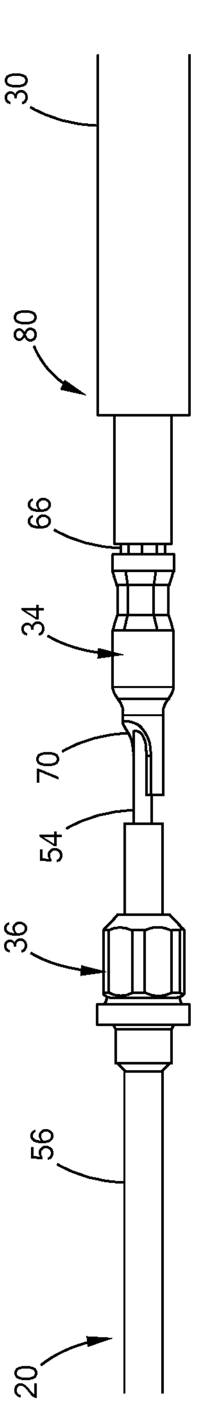
Figure 10:
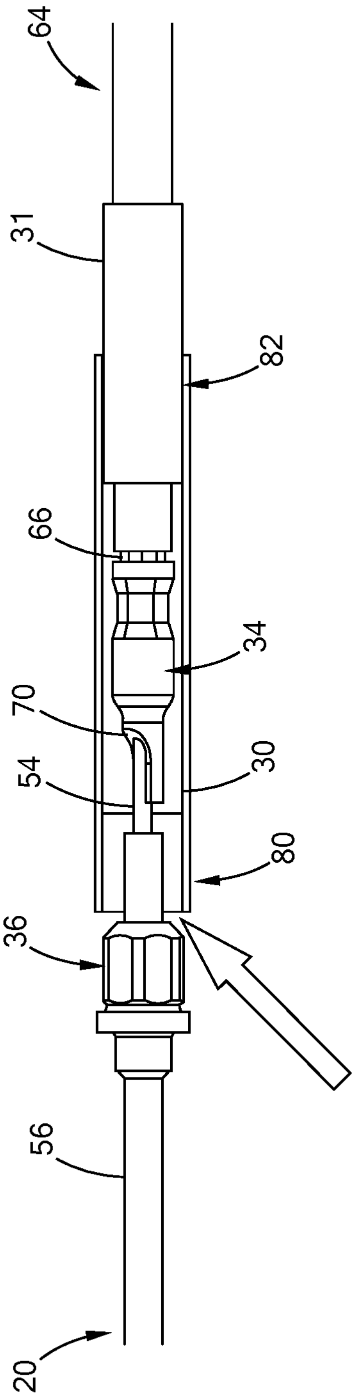
Figure 11:
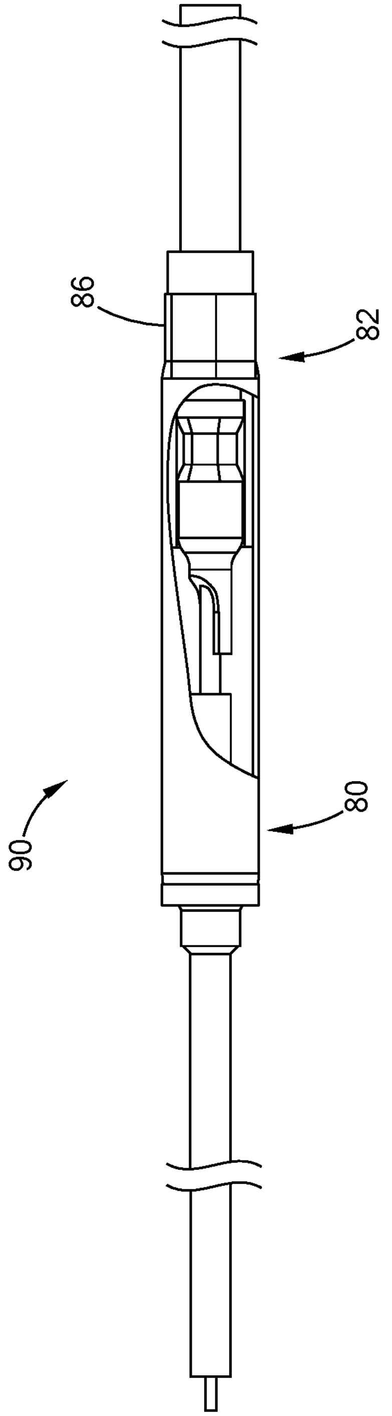
Figure 12:
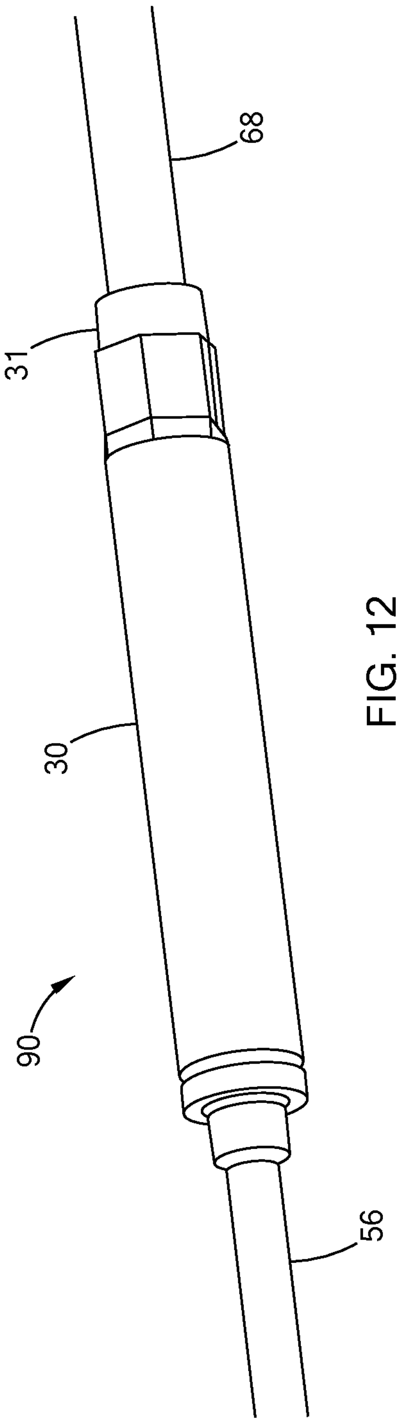
Figure 13:
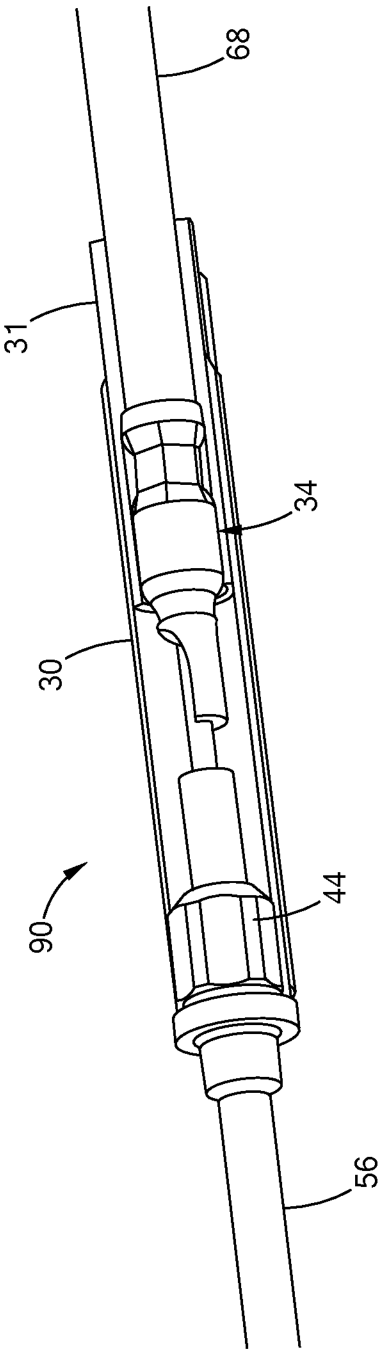
Figure 14:
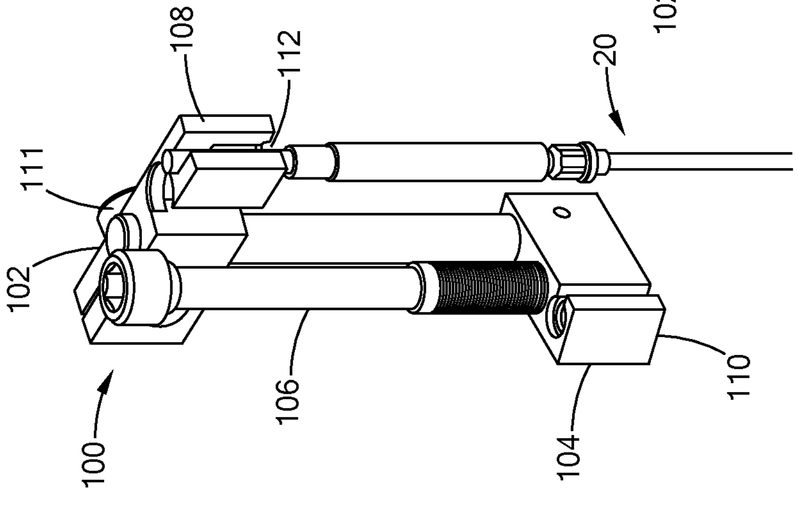
Figure 15:
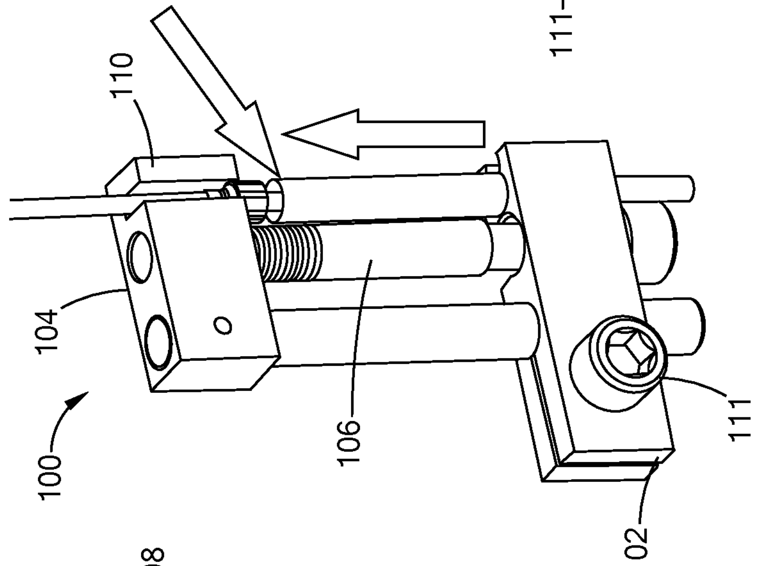
Figure 16:
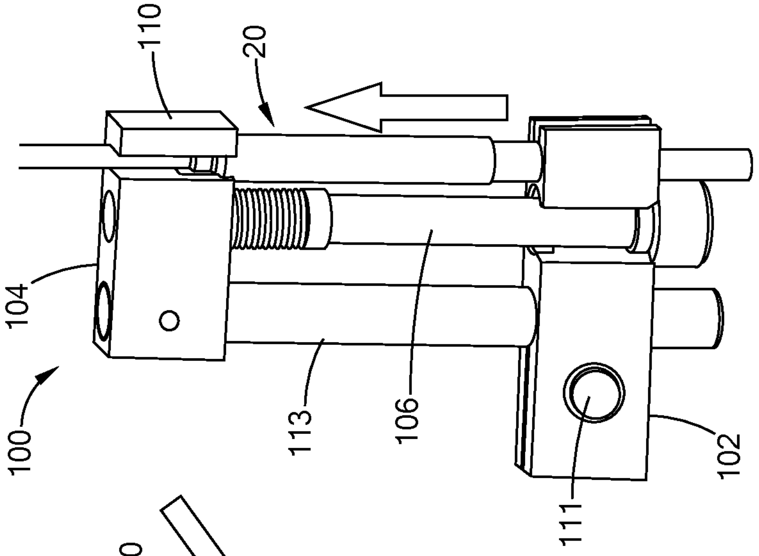
Figure 18:
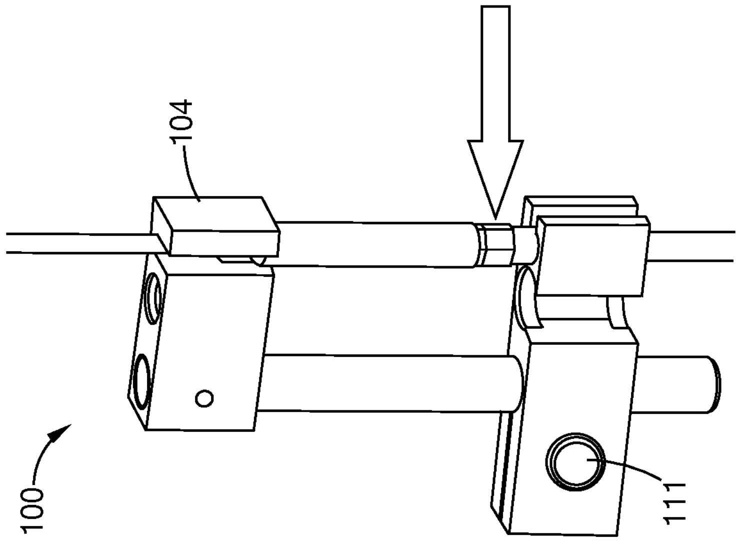
Figure 17:
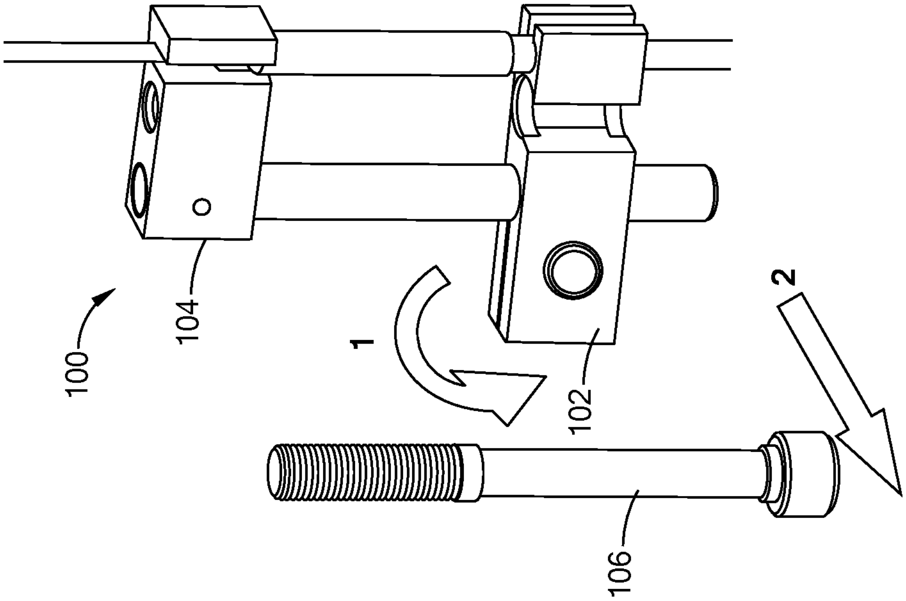
Figure 19:
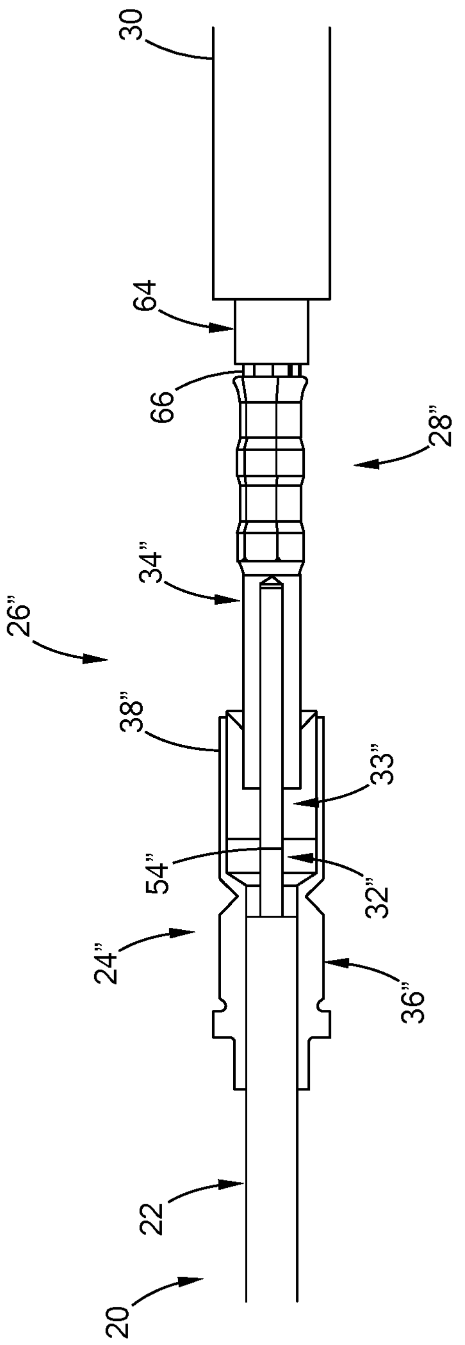
Figure 20:
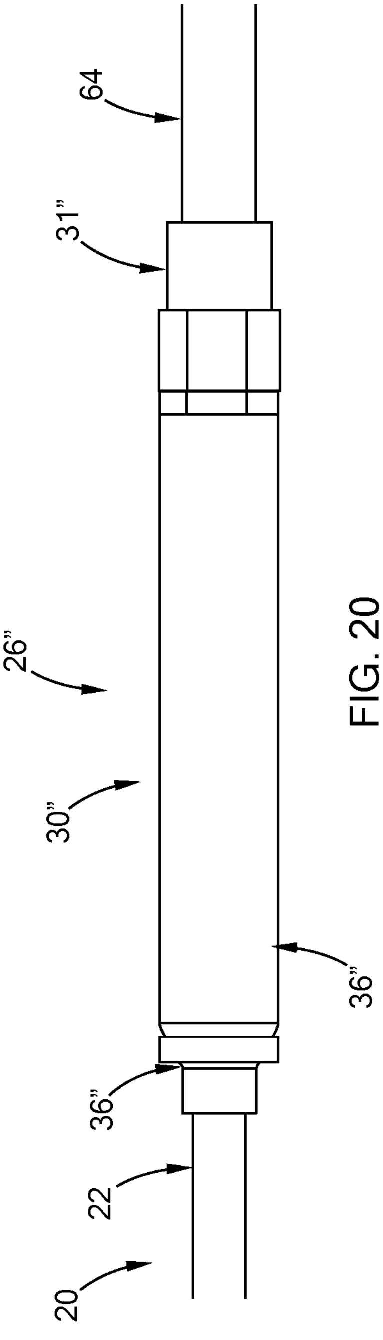

FIGS. 2 to 4 depict steps of forming a cable heater assembly in which the cable heater is pre-stripped, wherein: FIG. 2 depicts a step of stripping off a portion of an outer sheath of a cable heater and preparing a cover bushing; FIG. 3 depicts a step of covering the exposed portion of the conductor by the cover bushing and preparing a first adapter including an adapter body and a cap; and FIG. 4 depicts a step of joining the first adapter including an adapter body and a cap to an outer sheath of the cable heater to seal the stripped end of the cable heater;

FIG. 5A is a front view of a variant of a cable heater assembly constructed in accordance with the teachings of the present disclosure;

FIG. 5B is a cross-sectional view of the cable heater assembly of FIG. 5A, taken along line A-A of FIG. 5A;

FIG. 5C is an exploded view of the cable heater assembly of FIG. 5A;

FIGS. 6 to 8 depict steps of preparing a power cable ready for connection with a cable heater assembly, wherein: FIG. 6 depicts steps of preparing a second adapter to be mounted around the power cable; FIG. 7 depicts steps of disposing an adapter sleeve and a spacer bushing around the power cable and installing a connector around the conducting wires of the power cable that are exposed; FIG. 8 depicts a step of crimping the connector around the conducting wires;

FIGS. 9 to 11 depict steps of connecting a cable heater to a power cable, wherein: FIG. 9 depicts a step of inserting and soldering, crimping, or otherwise joining conductors of the cable heater into a connector crimped around conducting wires of the power cable; FIG. 10 depicts a step of moving an adapter sleeve toward the cable heater to surround the connector to admit resinous or solid infill media into the cavity defined by the adapter sleeve; and FIG. 11 depicts steps of further moving the adapter sleeve around an insertion portion of the cable heater assembly and crimping a distal end of the adapter sleeve to complete a cable heater and power cable assembly;

FIG. 12 is a perspective view of the cable heater and power cable assembly of FIG. 11;

FIG. 13 is a perspective, cross-sectional view of the cable heater and power cable assembly of FIG. 12;

FIGS. 14 to 16 depict a process of using an assembly tool to mount an adapter sleeve of an adapter system around an adapter body of the cable heater assembly, wherein: FIG. 14 depicts a step of clamping or registering one end of the cable heater and power cable assembly by the assembly tool; FIG. 15 depicts steps of clamping or positioning the other end of the cable heater and power cable assembly by the assembly tool, and moving the adapter sleeve towards the spacer bushing to increase a gap between the adapter body and a proximal end of the adapter sleeve; and FIG. 16 depicts a step of moving the insertion portion of the cable heater assembly into the adapter sleeve;

FIGS. 17 and 18 depict a process of crimping a distal end of the adapter sleeve of a cable heater and power cable assembly by an assembly tool, wherein: FIG. 17 depicts a step of removing a threaded shaft from the assembly tool; and FIG. 19 depicts a step of crimping a distal end of the adapter sleeve;

FIG. 19 is a cross-sectional view of a cable heater being connected to a power cable using another adapter system, conductors of the cable heater being inserted into a connector crimped around conducting wires of the power cable; and FIG. 20 is a perspective view of the cable heater and power cable assembly of FIG. 19.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1A:
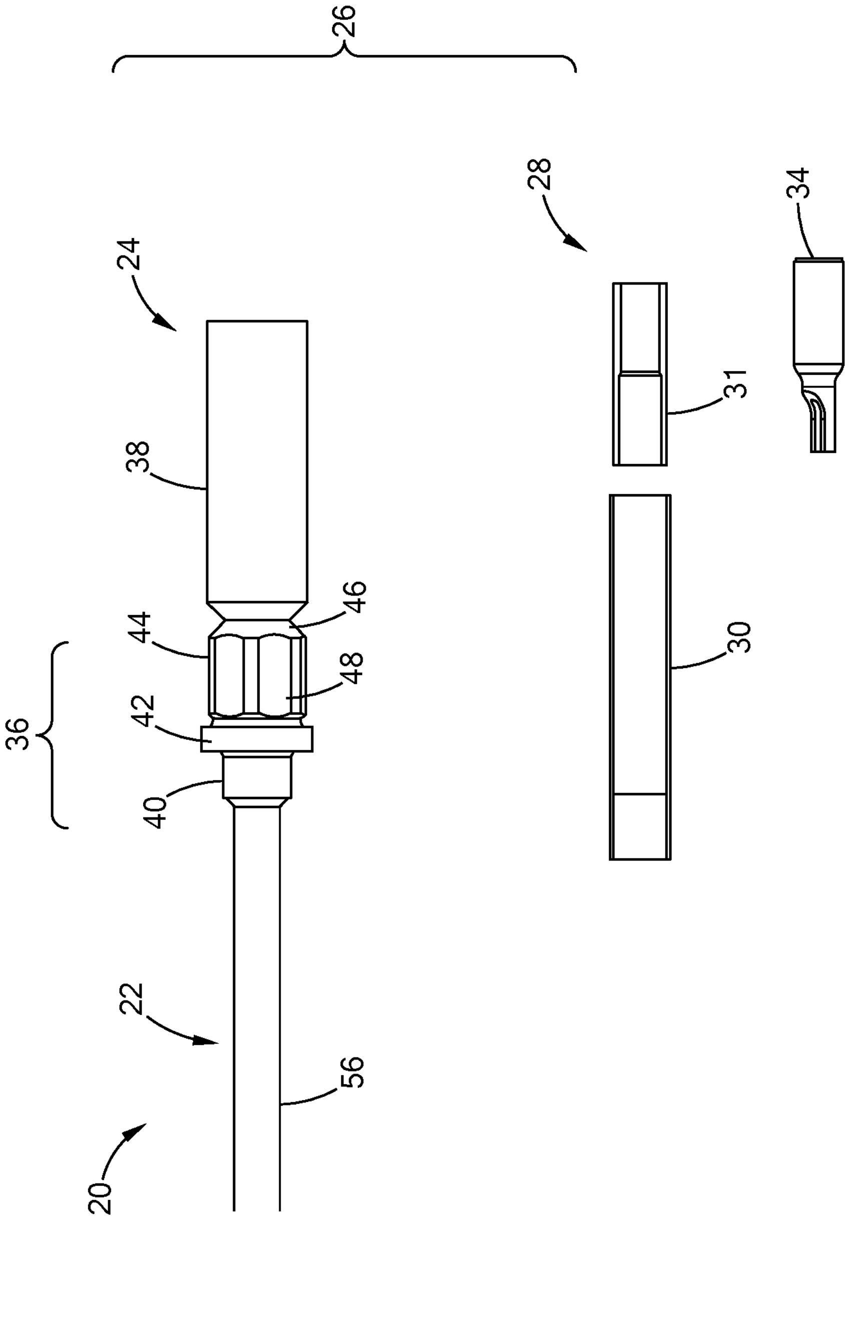
FIG. 1A is a front view of a cable heater assembly with a cable end adapter system constructed in accordance with the teachings of the present disclosure.

Referring to FIG. 1A, a cable heater assembly 20 constructed in accordance with the teachings of the present disclosure includes a cable heater 22 and a first adapter 24 fixed to an end of the cable heater 22 to facilitate connecting the cable heater 22 to another cable, such as a power cable. The first adapter 24 may be fixed to an end of the cable heater 22 by, for example, welding, crimping, brazing, or any other means known in the art. It should be understood that the teachings of the present disclosure are not limited to a cable heater 22, and thus the adapter system as illustrated and described herein may be employed with other types of resistive heaters, or sensors, (e.g., tubular heaters, cartridge heaters, layered heaters, among others) while remaining within the scope of the present disclosure.

The first adapter 24 is a part of an adapter system 26, which includes the first adapter 24 fixed to the cable heater 22 and a second adapter 28 to be mounted around the power cable to be connected to the cable heater 22. The second adapter 28 includes an adapter sleeve 30, a spacer bushing 31, and optionally a connector 34. The adapter system 26 facilitates connecting the cable heater 22 to the power cable during assembly, and provides sealing and protection for the spliced end after assembling, which will be described in more detail below.

To properly connect a heating cable to a power cable, typically, the heating cable is stripped on site to expose the conductors of the heating cable. Before the exposed portions of the conductors can be connected to the conducting wires of the power cable, the insulating material disposed around the exposed portions of the conductors needs to be removed and the exposed portion of the conductors needs to be cleaned. After the conductors of the heating cable are spliced to the conducting wires of the power cable, the spliced end must be properly insulated and sealed against oxidation and moisture intrusion. This is a difficult and time-consuming process.

In contrast, the cable heater assembly 20 and the adapter system 26 constructed in accordance with the teachings of the present disclosure allow an end user to connect the cable heater 22 to a power cable or another type of cable without going through the difficult and time-consuming processes of stripping an outer sheath, removing the insulating material, and cleaning the conductors on site. Moreover, the adapter system 26 has a structure to enclose and protect the spliced end against oxidation and moisture intrusion after the splicing process.

It is understood that the adapter system 26 can be used to connect any types of cables where stripping an outer sheath of the cable before splicing is needed. Therefore, the cable heater assembly 20 may be modified to be a cable assembly for the purpose of electrical connection without a heating function, without departing from the scope of the present disclosure.

As shown, the first adapter 24 includes an adapter body 36 and a cap 38. The adapter body 36 includes a shaft portion 40, a flange 42 joined to the shaft portion 40, and an insertion portion 44. A notch 46, for example, a V notch, is formed between the insertion portion 44 and the cap 38. In one form, the cap 38 is formed as a conjoined and sealed component either attached or integral to the adapter body 36 and is joined to a part of the adapter body 36 shown herein as the insertion portion 44. In another form, the cap 38 may be formed as a separate component from the adapter body 36 and connected to the adapter body 36 by threaded engagement as shown in FIGS. 5A-5C, which will be described in more detail later. The insertion portion 44 includes at least one non-cylindrical or flat surface 48. In one form, the insertion portion 44 includes six flat surfaces 48 to define a hexagonal configuration.

Referring to FIG. 1A, the cable heater 22 has a cable configuration and includes a resistive heating element 52, a plurality of conductors 54 (shown in FIG. 2) connected to the resistive heating element 52, an outer sheath 56 surrounding the resistive heating element 52, and an insulating material 58, such as insulating minerals compacted inside the space between the outer sheath 56 and the resistive heating element 52 to electrically insulate the resistive heating element 52. In another example, a thermal element assembly is provided. In this form, the thermal element itself may be a heating element as illustrated and described herein or may be another thermal element such as a temperature sensor or other functional conductor. Accordingly, the teachings herein for the adapter system 26 should not be limited to a resistive heating element and may be applied to any assembly that includes a conductor. In other words, the conductor may be a resistive heating element, a temperature sensor, or other electrically conductive member.

Figure 1B:
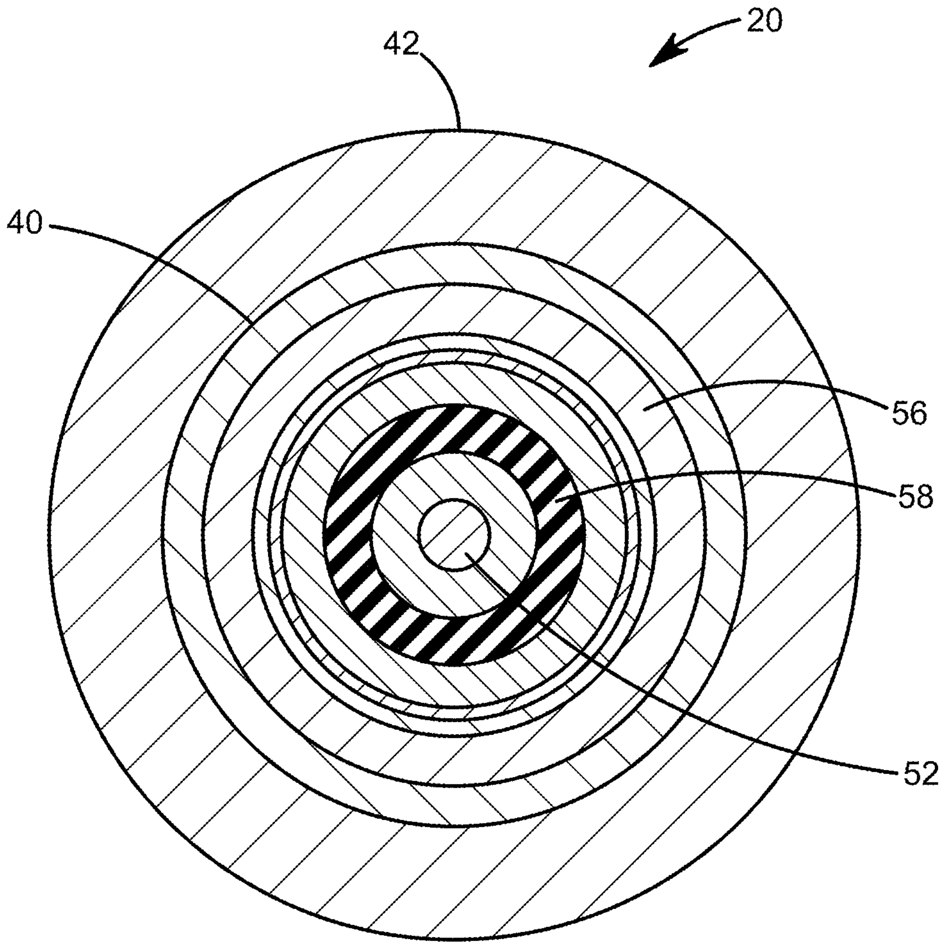
FIG. 1B is a cross-sectional view of the cable heater assembly of FIG. 1A.

Referring to FIGS. 2 to 4, a process of forming a cable heater assembly 20 is now described. As shown in FIG. 2, to prepare the cable heater assembly 20 for easy connection with another cable, the outer sheath 56 of the cable heater 22 is pre-stripped to expose a portion of the conductors 54 (only one is shown in FIG. 2). As shown in FIG. 3, after the insulating material 58 (shown in FIG. 1B) around the exposed portion of the conductors 54 is removed and the exposed portion of the conductors 54 is cleaned, a cover bushing 60 is loosely disposed around the exposed portion of the conductors 54 to protect the exposed portion of the conductors 54 while preventing the compacted insulating material 58 from falling off from inside the outer sheath 56. The Referring to FIG. 4, thereafter, the first adapter 24 including the adapter body 36 and the cap 38 is placed around the cover bushing 60 and keeps the end of the cover bushing 60 abutting against the stripped end 61 of the outer sheath 56. The first adapter 24 is then affixed to the outer sheath 56 within the limits of adapter body 36 by means such as brazing at the end of shaft portion 40. The entire combination is then suitable for intermediate processing and assembly steps, such as liquid or vapor bath cleaning, abrasive media surface refinement, coating, plating, or chemical etching and also storage with reduced sensitivity to environmental conditions and physical bending, manipulation and handling to install or assemble the cable heater with mating substrates including use of assembly methods such as electron-beam welding and furnace brazing. The cap 38 is made of a high-temperature material that can survive extreme environment such as furnace brazing process.

As shown, the cap 38 is placed over the cover bushing 60 to hold the cover bushing 60 against the stripped end 61 of the outer sheath 56. The cap 38 also encloses the stripped end 61 of the outer sheath 56, the cover bushing 60, and the conductors 54 within the cap 38. As a result, the exposed portion of the conductors 54 is completely disposed inside the cap 38. Since the cable heater 22 of the cable heater assembly 20 is in a pre-stripped condition and is completely sealed against any contamination by the cover bushing 60 and the cap 38, the cable heater assembly 20 can be cleaned, handled, installed, or furnace brazed, etc.

Referring to FIGS. 5A, 5B and 5C, alternatively, a first adapter 24' configured to be fixed to an end of a cable heater 22 and protect and seal a pre-stripped end 61 of the cable heater 22 may include an adapter body 36' and a cap 38' that are formed as separate components and connected by threaded engagement. Similarly, the adapter body 36' includes a shaft portion 40', a flange 42', and an insertion portion 44'. In this variant, the insertion portion 44' is formed as a threaded portion having outer threads 49 for engaging inner threads 50 on the inner surface of the cap 38'. The cap 38' has a closed end 51 and an open end 53. The inner threads 50 are formed at the open end 53. A cover bushing 60' for covering the exposed portion of the conductors 54 may be configured to have an outer profile conforming to an inner profile of the cap 38'. The first adapter 24' additionally includes a seal 55 to provide sealing for the threaded engagement. In this variant, the cap 38' is replaceable for the purpose of verifying cable electrical integrity during intermediate processing steps such as cleaning, bending/forming, brazing, staking, etc. The cap 38' can be removed and re-applied for intermediate testing to validate the performance and quality of the heater cable 22.

Referring to FIGS. 6 to 8, a process of preparing a power cable for connection with the cable heater assembly 20 is now described. The power cable 64 includes conducting wires 66 and an outer sheath 68 surrounding the conducting wires 66 with a portion of the conducting wires 66 exposed from the outer sheath 68. As previously described, the second adapter 28 of the adapter system 26 is to be mounted around a power cable 64 to facilitate the connection of the cable heater assembly 20 to the power cable 64.

To prepare the power cable 64 for connection with the cable heater assembly 20, the spacer bushing 31 is placed and fits around the outer sheath 68 of the power cable 64 and the adapter sleeve 30 is placed and fits around the spacer bushing 31 while allowing movement of the spacer bushing 31 relative to the outer sheath 68 of the power cable 64 and movement of the adapter sleeve 30 relative to the spacer bushing 31. The connector 34 is disposed around the exposed portion of the conducting wires 66 by inserting the conducting wires 66 into the connector 34 having an adjunct opening 70 as part of the connector 34. Then, the connector 34 is crimped to form a crimped portion 72 such that the connector 34 is fixed to the conducting wires 66.

For a first adapter body 36' having a threaded portion 44' as shown in FIGS. 5A to 5C, an adapter sleeve 30' with a threaded portion as shown in FIG. 6 is used for the threaded connection between the first adapter body 36' and the insertion portion 44' of the first adapter body 36'.

Referring to FIG. 9 in conjunction with FIG. 4, to connect the cable heater assembly 20 to the power cable 64, the conductors 54 of the cable heater 22 need to be exposed. Since the cable heater 22 is in a pre-stripped condition, an end user can easily remove the cap 38 by cutting or breaking the first adapter 24 along the notch 46 (FIG. 4), such as by using a saw or a pipe-cutter, to separate the cap 38 from the adapter body 36 leaving the adapter body 36 attached to the outer sheath 56. The notch 46 between the adapter body 36 and the cap 38 helps the end user identify a specific location for separation of the cap 38 to expose the stripped end 61 of the cable heater 22 that has been pre-stripped. When the cap 38 is removed, the cover bushing 60 is exposed. The cover bushing 60 that is loosely placed around the conductors 54 is removed to expose the conductors 54.

Referring to FIGS. 9 to 11, a process of connecting the cable heater assembly 20 to the power cable 64 is now described.

As shown in FIG. 9, when the conductors 54 of the cable heater assembly 20 are exposed and the conducting wires 66 are inserted into the connector 34, the cable heater assembly 20 and the power cable 64 are now ready for splicing. The conductors 54 of the cable heater assembly 20 are inserted into the connector 34 through the opening 70. The conductors 54 and the conducting wires 66 may be spliced using the connector 34 by low-temperature soldering, crimping, or any other means known in the art. The connector 34 provides support for the conductors 54 and the conducting wires 64 during the splicing process.

Referring to FIG. 10, after the spliced end is formed, the adapter sleeve 30 is moved along the length direction of the power cable 64 toward the cable heater assembly 20 to surround the connector 34 in which the spliced end is received. The adapter sleeve 30 is loosely mounted around the spacer bushing 31 such that the adapter sleeve 30 can move relative to the spacer bushing 31 which remains closely fitted and approximately fixed onto the outer sheath 68 of the power cable 64. The adapter sleeve 30 has a proximal end 80 proximate the heater cable assembly 20 and a distal end 82 opposing the proximal end 80. When the adapter sleeve 30 is moved to surround the connector 34, resinous insulating material or suitable solid insulation media can be admitted to infill the cavity defined by the interior wall of the adapter sleeve 30. The spacer bushing 31 is press-fit into the distal end 82 of the adapter sleeve 30 to close the distal end 82 of the adapter sleeve 30.

Referring to FIGS. 11 to 13, the adapter sleeve 30 continues to be moved toward the cable heater assembly 20 until the proximal end 80 of the adapter sleeve 30 surrounds the insertion portion 44 of the adapter body 36. The proximal end 80 of the adapter sleeve 30 may be fixed to the insertion portion 44 by interference fit, threaded engagement, as the adapter sleeve 30' may include a threaded end as shown in FIG. 6, or crimp deformation. The flat surfaces 48 of the insertion portion 44 allow for a number of adapter sleeves 30 having different inside diameters to engage the insertion portion 44 by an interference fit. With the flat surfaces 48 on the insertion portion 44, a plurality of openings are defined between the inner surface of the adapter sleeve 30 and the flat surfaces 48. A sealing material, such as epoxy, may be either extruded into the openings by action of displacing the spacer bushing 31 to remove trapped air from the assembly, or injected into the adapter sleeve 30 through the plurality of openings. The adapter sleeve 30 is secured to the cable heater assembly 20 and to the adapter body 36 by the sealing material, and the spliced end and the connector 34 are embedded in the sealing material against oxidation and moisture intrusion.

After the sealing material fills into the space inside the adapter sleeve 30, the distal end 82 of the adapter sleeve 30 is crimped to tighten around the spacer bushing 31 to form a crimped portion 86. The crimped portion 86 of the adapter sleeve 30 provides strain relief for the power cable 64. The entire combination may, upon complete cure of the resin, then be subjected to vacuum and thermal cycling processes to verify epoxy adhesion and overall seal integrity to complete a cable heater and power cable assembly 90.

Referring back to FIG. 10, after the adapter sleeve 30 is moved toward the adapter body 36 of the cable heater assembly 20, due to the size of the adapter body 36 and the adapter sleeve 30, it may be difficult to move the adapter sleeve 30 to make the adapter sleeve 30 mounted around the insertion portion 44 of the adapter body 36 without using a tool. Therefore, an assembly tool 100 may be used to drive the adapter sleeve 30 to its final position relative to the cable heater assembly 20.

Referring to FIGS. 14 to 16, the assembly tool 100 includes a first support 102, a second support 104, and a threaded shaft 106 disposed between the first support 102 and the second support 104. The first support 102 includes a first yoke or clamping structure 108 for positioning and/or clamping the power cable as shown in FIG. 14. The second support 104 includes a second yoke or clamping structure 110 for positioning and/or clamping the adapter body 36 of the cable heater assembly 20 as shown in FIG. 15. By rotating the threaded shaft 106, the first support 102 and the second support 104 can be moved closer or away from each other.

As shown in FIG. 15, after the assembly is clamped on the first and second supports 102, 104, the tool assembly 100 is placed upside down such that the adapter body 36 is placed on top of the spacer bushing 31 with the adapter sleeve 30 disposed therebetween. In this position, the adapter sleeve 30 is moved down toward the spacer bushing 31 to increase a gap between the insertion portion 44 of the adapter body 36 and the proximal end 80 of the adapter sleeve 30. By rotating the threaded shaft 106, the distance between the first support 102 and the second support 104 is reduced, thereby causing the insertion portion 44 of the adapter body 36 to be inserted into the proximal end 80 of the adapter sleeve 30 while a recess 112 of suitable size in the first support 102 allows the spacer bushing 31 to remain extended from the distal end 82 of the adapter sleeve 30 during insertion. As shown in FIG. 16, by inverting the first support 102 on an alignment shaft 113 to present a surface of suitable size to now bear on the face of spacer bushing 31, rotating the threaded shaft 106 will drive the spacer bushing 31 into the distal end 82 of the adapter body 36 causing the exhaustion of entrapped air and promoting infill of the resin into the plurality of openings defined between the inner surface of the adapter sleeve 30 and the flat surfaces 48, and also to conform to the surface contours of the cable heater 22, the stripped end 61 of the outer sheath 56, the conductor 54 of the heater cable 22, the connector 34, and the exposed portion of conducting wires 66.

Referring to FIGS. 17 and 18, after the insertion portion 44 is inserted into the proximal end 80 of the adapter sleeve 30, and the spacer bushing 31 is suitably constraining the enclosed resin within the assembly, the first support 102 is locked in position by tightening the clamping bolt 111 on the side of the support 102. Then, the threaded shaft 106 may be removed from the assembly tool 100 to allow clearance for crimp tool dies. A press tool (not shown) may be used to crimp the distal end 82 of the adapter sleeve 30. By this clamping action, the distal end 82 of the adapter sleeve 30 is crimped against the spacer bushing 31 to form a crimped portion 86 that provides strain relief for the spliced end. The completed cable heater and power cable assembly 90 is then removed from the tool.

In summary, the heater cable assembly of the present disclosure includes a separable high-temperature cap that can enclose and seal the stripped end of the pre-stripped cable heater and limits displacement and loss of insulation material during storage and intermediate processing and assembly handling. The cap is made of a material that can sustain high-temperature processing, handling and manipulation as well as exposure to various chemical and atmospheric conditions as may be required for assembly of the cable into the application. The cap can be joined, such as by threaded engagement, brazing, or manufactured as an integral unit with the adapter body to form the first adapter as an integral unit. The heater cable assembly 20 including the threaded removable cap can be tested for its integrity during and/or between intermediate processing steps such as bending & forming, staking, or cleaning. Seal is maintained until the cap is removed by unthreading, cutting or slitting to expose the stripped end of the cable heater.

Since the stripping of the outer sheath of the cable heater is performed at factory, an end user does not need to perform the process of stripping a portion of the outer sheath, removing the insulating material, and cleaning the exposed portion of the conductors on site. An end user only needs to remove the cap, remove the cover bushing to expose the conductors of the cable heater that are in a condition ready for splicing. Therefore, the time for connecting the cable heater to a power cable is significantly reduced. Since the time for which the conductors and the conducting wires are exposed to the outside environment is reduced, the conductors and conducting wires are less prone to damage due to oxidation or moisture intrusion.

Moreover, the threaded type adapter cap is capable of being removed and re-applied for intermediate testing to validate the performance and quality of the heater cable and power cable assembly as long as the cable heater is not damaged.

The cable heater assembly and its adapter system and method allow the difficult and time-consuming tasks, including stripping a portion of the outer sheath of the cable heater, removing the insulating material, and cleaning the conductors that have been exposed, to be performed in a factory setting by proper tools and under controlled conditions while providing proper protection and sealing for the pre-stripped end of the cable heater. As a result, the time to complete each termination on site is reduced. The adapter system also allows for easy introduction of the sealing material around the spliced end and can further reduce the time required for assembling the cable heater and the power cable. The reduced assembling time also limits the exposure to contamination from atmospheric moisture and other jobsite contaminants that tend to compromise integrity of the electrical insulation material.

Referring to FIGS. 19 and 20, an adapter system 26" is illustrated. The adapter system 26" connects the cable heater 22 and the power cable 64 to each other. The structure and function of the adapter system 26" is similar to the adapter system 26 described above aside from the differences described below.

The adapter system 26" comprises a first adapter 24", a plunger or packing bushing 33" and a second adapter 28". The first adapter 24" includes an adapter body 36" and a cap 38". The cap 38" includes a cavity 32" which permits the admittance of a resinous insulating material or suitable solid insulation media at an opening of the cavity to an end of the sheath of the cable heater 22. In this way, exposure time of the conductor 54" is reduced. The first adapter 24" is allowed to accommodate various insulating materials within the cavity 32".

The second adapter 28" includes an adapter sleeve 30, a spacer bushing 31", and a connector 34". The connector 34" is disposed around the exposed portion of the conducting wires 66 by inserting the conducting wires 66 into the connector 34". Then, the connector 34" is crimped to form a crimped portion such that the connector 34" is fixed to the conducting wires 66. The plunger 33" is then secured over the connector 34" such that an end portion of the connector 34" is received in a cavity of the plunger 33". In one example, the plunger 33" is secured over the connector by a press fit. The conductor 54" is then joined to the conducting wires 66 by inserting the plunger 33" and the connector 34" into the cavity 32" of the cap 38" such that the conductor 54" extends through the plunger 33" into an opening of the connector 34". In this way, the spliced end of the connector 34 is aligned within the cavity 32" and insulated. The connector 34" is then crimped to form a crimped portion such that the connector 34" is fixed to the conductor 54". The adapter sleeve 30 is then secured to the spacer bushing 31" and the cable heater assembly 20 as described above. The entire combination is heated for a predetermined time at a predetermined temperature to verify epoxy adhesion and overall seal integrity to complete a cable heater and power cable assembly.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A heater assembly comprising:

a heater including an outer sheath and a conductor, a portion of the conductor being exposed from the outer sheath; and an adapter system comprising an adapter body mounted to an end of the heater and a cap joined to the adapter body to enclose the portion of the conductor inside the cap;

a cover bushing disposed around the portion of the conductor inside the cap, wherein the heater is configured to be connected to a power cable by removing the cap and the cover bushing to expose the portion of the conductor.

2. The heater assembly according to claim 1, wherein the cap protects and seals the portion of the conductor therein.

3. The heater assembly according to claim 1, wherein the adapter body and the cap define a notch therebetween.

4. The heater assembly according to claim 3, wherein the notch is a V notch.

5. The heater assembly according to claim 1, wherein the cap is integral to or joined to the adapter body by a process selected from a group consisting of mechanical fastening, chemical bonding, welding, bonding by adhesives, brazing or threaded engagement.

6. The heater assembly according to claim 1, wherein the outer sheath of the heater has a stripped end extending into the cap.

7. The heater assembly according to claim 1, wherein the heater is selected from a group consisting of a cable heater, a tubular heater, and a cartridge heater.

8. A heater and power cable assembly comprising:

a heater including an outer sheath and a conductor, a portion of the conductor being exposed from the outer sheath;

a power cable including an outer sheath and conducting wires exposed from the outer sheath of the power cable; and an adapter system comprising an adapter body secured around an outer sheath of the heater, an adapter sleeve, and a spacer bushing, the adapter body includes an insertion portion having a plurality of flat sides defining a predetermined shape, wherein the conductor of the heater is spliced to the conducting wires of the power cable to form a spliced end, the spliced end being disposed inside the adapter sleeve, the adapter body and the spacer bushing being inserted into opposing ends of the adapter sleeve, respectively, and wherein the heater and power cable assembly further comprises a sealing material filled in the adapter sleeve, the spliced end being embedded in the sealing material.

9. The heater and power cable assembly according to claim 8, wherein the adapter body and the spacer bushing are fixed to opposing ends of the adapter sleeve by interference fit, threaded connection, or compression fitting.

10. The heater and power cable assembly according to claim 9, wherein one of the opposing ends proximate the power cable is crimped to provide strain relief for the spliced end.

11. The heater and power cable assembly according to claim 10, wherein the predetermined shape is a hexagonal shape.

12. The heater and power cable assembly according to claim 8, wherein the adapter system further comprises a connector disposed around the conducting wires of the power cable.

13. The heater and power cable assembly according to claim 12, wherein the adapter body comprises a cavity, and wherein the sealing material is filled in the cavity of the adapter body.

14. The heater and power cable assembly according to claim 12, wherein the connector is fixed to the conducting wires by crimping.

15. The heater and power cable assembly according to claim 12, wherein the conductor of the heater is inserted into the connector.

16. The heater and power cable assembly according to claim 15, wherein the spliced end is supported by the connector.

17. The heater and power cable assembly according to claim 8, wherein the adapter body is bonded to the adapter sleeve by the sealing material.

18. A thermal and power cable assembly comprising:

a thermal element assembly including an outer sheath and a conductor, a portion of the conductor being exposed from the outer sheath;

a power cable including an outer sheath and conducting wires exposed from the outer sheath of the power cable; and an adapter system comprising an adapter body secured around an outer sheath of the thermal element assembly, an adapter sleeve, and a spacer bushing, the adapter body includes an insertion portion having a plurality of flat sides defining a predetermined shape, wherein the conductor of the thermal element assembly is spliced to the conducting wires of the power cable to form a spliced end, the spliced end being disposed inside the adapter sleeve, the adapter body and the spacer bushing being inserted into opposing ends of the adapter sleeve, respectively, wherein the thermal and power cable assembly further comprises a sealing material filled in the adapter sleeve, the spliced end being embedded in the sealing material.

19. The thermal and power cable assembly according to claim 18, wherein the thermal element assembly comprises a heater.

20. The thermal and power cable assembly according to claim 18, wherein the thermal element assembly comprises a temperature sensor.

* * * * *